(12) United States Patent
Konet et al.

(10) Patent No.: US 9,177,478 B2
(45) Date of Patent: Nov. 3, 2015

(54) VEHICLE CONTACT AVOIDANCE SYSTEM (71) Applicant: Nissan North America, Inc., Franklin, TN (US)

(72) Inventors: Heather Konet, Canton, MI (US); Neal Probert, Farmington Hills, MI (US); Jeremy Chambers, Casco, MI (US); Roy Goudy, Farmington Hills, MI (US); Andrew Christensen, Livonia, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 71 days.

(21) Appl. No.: 14/070,356

(22) Filed: Nov. 1, 2013

(65) Prior Publication Data
US 2015/0123778 A1 May 7, 2015

(51) Int. Cl.
*B60Q 1/00* (2006.01)
*G08G 1/16* (2006.01)
*G08B 3/10* (2006.01)

(52) U.S. Cl.
CPC *G08G 1/166* (2013.01); *G08B 3/10* (2013.01); *G08G 1/161* (2013.01); *G08G 1/164* (2013.01)

(58) Field of Classification Search
CPC ......... G08B 3/10; G08G 1/161; G08G 1/164; G08G 1/166
USPC .............. 340/435, 540, 679, 685, 425.5, 436, 340/901–903, 945, 961, 636.15, 636.1, 340/686.1
See application file for complete search history.

(56) References Cited

U.S. PATENT DOCUMENTS

| 4,352,088 A | | 9/1982 | Tsunoda |
| 4,644,327 A | | 2/1987 | Patterson |
| 4,706,072 A | | 11/1987 | Ikeyama |
| 4,903,291 A | * | 2/1990 | Tsurufuji et al. .......... 379/88.01 |

(Continued)

FOREIGN PATENT DOCUMENTS

| EP | 1 962 255 A1 | 8/2008 |
| JP | 59-102634 A | 6/1984 |

(Continued)

OTHER PUBLICATIONS

Kurt, Arda et al., "Hybrid-state driver/vehicle modelling, estimation and prediction", 13th International IEEE Annual Conference on Intelligent Transportation Systems, Madeira Island, Portugal, Paper TA3.4, Sep. 19-22, 2010, pp. 806-811.

(Continued)

*Primary Examiner* — Daniel Previl
(74) *Attorney, Agent, or Firm* — Global IP Counselors, LLP (57) ABSTRACT

A vehicle contact avoidance system includes a detection system, a warning system, and a controller. The detection system is configured to detect a remote obstacle in proximity to a host vehicle equipped with the vehicle contact avoidance system, including information related to at least one of a speed, a direction and a distance of the remote obstacle relative to the host vehicle. The warning system is configured to emit a warning sound to notify a driver of the host vehicle of imminent contact between the host vehicle and the remote obstacle. The controller is programmed to determine whether contact between the host vehicle and the remote obstacle is imminent based of the information supplied to the controller by the detection system, and programmed to cause the warning system to emit the warning sound. The warning sound includes a non-speech portion and a speech portion.

18 Claims, 10 Drawing Sheets (56) References Cited

U.S. PATENT DOCUMENTS

| | | | |
|---|---|---|---|
| 5,620,155 A * | 4/1997 | Michalek | 246/121 |
| 5,788,336 A | 8/1998 | Trovato et al. | |
| 5,845,250 A | 12/1998 | Vogten | |
| 5,939,976 A | 8/1999 | Sasaki et al. | |
| 5,940,010 A | 8/1999 | Sasaki et al. | |
| 5,979,586 A * | 11/1999 | Farmer et al. | 180/274 |
| 6,008,741 A | 12/1999 | Shinagawa et al. | |
| 6,259,992 B1 * | 7/2001 | Urai et al. | 701/301 |
| 6,294,987 B1 * | 9/2001 | Matsuda et al. | 340/436 |
| 6,366,207 B1 | 4/2002 | Murphy | |
| 6,615,137 B2 * | 9/2003 | Lutter et al. | 701/301 |
| 6,700,504 B1 | 3/2004 | Aslandogan et al. | |
| 6,720,898 B1 | 4/2004 | Ostrem | |
| 6,791,471 B2 | 9/2004 | Wehner et al. | |
| 6,810,328 B2 | 10/2004 | Yokota et al. | |
| 7,274,288 B2 | 9/2007 | Nagata | |
| 8,000,897 B2 | 8/2011 | Breed et al. | |
| 8,175,796 B1 | 5/2012 | Blackburn et al. | |
| 8,340,894 B2 | 12/2012 | Yester | |
| 8,466,807 B2 | 6/2013 | Mudalige | |
| 8,548,729 B2 | 10/2013 | Mizuguchi | |
| 8,577,550 B2 | 11/2013 | Lu et al. | |
| 8,587,418 B2 | 11/2013 | Mochizuki et al. | |
| 8,639,426 B2 | 1/2014 | Dedes et al. | |
| 8,717,192 B2 * | 5/2014 | Durekovic et al. | 340/903 |
| 2007/0103276 A1 * | 5/2007 | Kousaka et al. | 340/388.1 |
| 2009/0033540 A1 | 2/2009 | Breed et al. | |
| 2009/0140887 A1 | 6/2009 | Breed et al. | |
| 2009/0198412 A1 | 8/2009 | Shiraki | |
| 2010/0169009 A1 | 7/2010 | Breed et al. | |
| 2012/0016581 A1 | 1/2012 | Mochizuki et al. | |
| 2012/0218093 A1 | 8/2012 | Yoshizawa et al. | |
| 2013/0116915 A1 | 5/2013 | Ferreira et al. | |
| 2013/0179047 A1 | 7/2013 | Miller et al. | |
| 2013/0268184 A1 * | 10/2013 | Zagorski et al. | 701/300 |
| 2013/0278440 A1 | 10/2013 | Robin et al. | |

FOREIGN PATENT DOCUMENTS

| | | |
|---|---|---|
| JP | 61-253238 A | 11/1986 |
| JP | 2000-127796 A | 5/2000 |
| JP | 2001-118199 A | 4/2001 |
| JP | 2003-51099 A | 2/2003 |
| WO | 03/091966 A1 | 11/2003 |

OTHER PUBLICATIONS

Kurt, Arda (dissertation), "Hybrid-state system modelling for control, estimation and prediction in vehicular autonomy", presented in Partial Fulfillment of the Requirements for the Degree Doctor of Philosophy in the Graduate School of The Ohio State University, Mar. 2012, UMI/Proquest Pub. No. 3497707, 136 pages (total).

John Jacob Winters, An Investigation of Auditory Icons and Brake Response Times in a Commercial Truck-Cab Environment (Virginia Polytechnic Institute and State Univ. 1998).

Driver Focus-Telematics Working Group, Statement of Principles, Criteria and Verification Procedures on Driver Interactions with Advanced In-vehicle Information and Communication Systems (Version 2.0, 2002).

John L. Campbell et al., Comprehension Testing of Active Safety Symbols (SAE International 2004).

Pontus Larsson et al., Emotional and Behavioral Response to Auditory Icons and Earcons in Driver-vehicle Interfaces (Sweden, Paper No. 09-0104).

M.L. Cummings et al., Effects of Single versus Multiple Warnings on Driver Performance (Human Factors and Ergonomics Society 2011).

Michael A. Nees & Bruce N. Walker, Auditory Displays for In-vehicle Technologies (Human Factors and Ergonomics Society 2011).

Kathleen A. Harber, John Bloomfield, and Benjamin J. Chibak, The Effectiveness of Auditory Side- and Forward-Collision Avoidance Warnings in Winter Driving Conditions (Minnesota Department of Transportation, Report No. MN/RC 2003-14,2003).

* cited by examiner

VEHICLE CONTACT AVOIDANCE SYSTEM

BACKGROUND

1. Field of the Invention

The present invention generally relates to a contact avoidance system and method for vehicles. More specifically, the present invention relates to a contact avoidance system and method that is capable of detecting imminent contact with a remote obstacle and activating a warning that includes both a speech portion and a non-speech portion.

2. Background Information

In recent years, vehicles have become equipped with features that predict, warn of, and/or attempt to avoid contact with remote obstacles. For example, vehicles can be equipped with a contact warning system that identifies possible contact with an obstacle and notifies the driver of the vehicle of imminent contact. If the possibility of contact exists, the system can issue a warning to the driver using a sound so that the driver can take the appropriate action.

Accordingly, to continue advancing the robustness of such vehicle features, a need exists for an improved vehicle contact avoidance system.

SUMMARY

It has been discovered that to improve vehicle contact avoidance systems a warning indicator may include both a speech portion and a non-speech portion.

In accordance with one aspect of the present invention, a vehicle contact avoidance system is provided. The system comprises a detection system, a warning system, and a controller. The detection system is configured to detect a remote obstacle in proximity to a host vehicle equipped with the vehicle contact avoidance system, including information related to at least one of a speed, a direction and a distance of the remote obstacle relative to the host vehicle. The warning system is configured to emit a warning sound to notify a driver of the host vehicle of imminent contact between the host vehicle and the remote obstacle. The controller is programmed to determine whether contact between the host vehicle and the remote obstacle is imminent based of the information supplied to the controller by the detection system, and programmed to cause the warning system to emit the warning sound. The warning sound includes a non-speech portion and a speech portion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
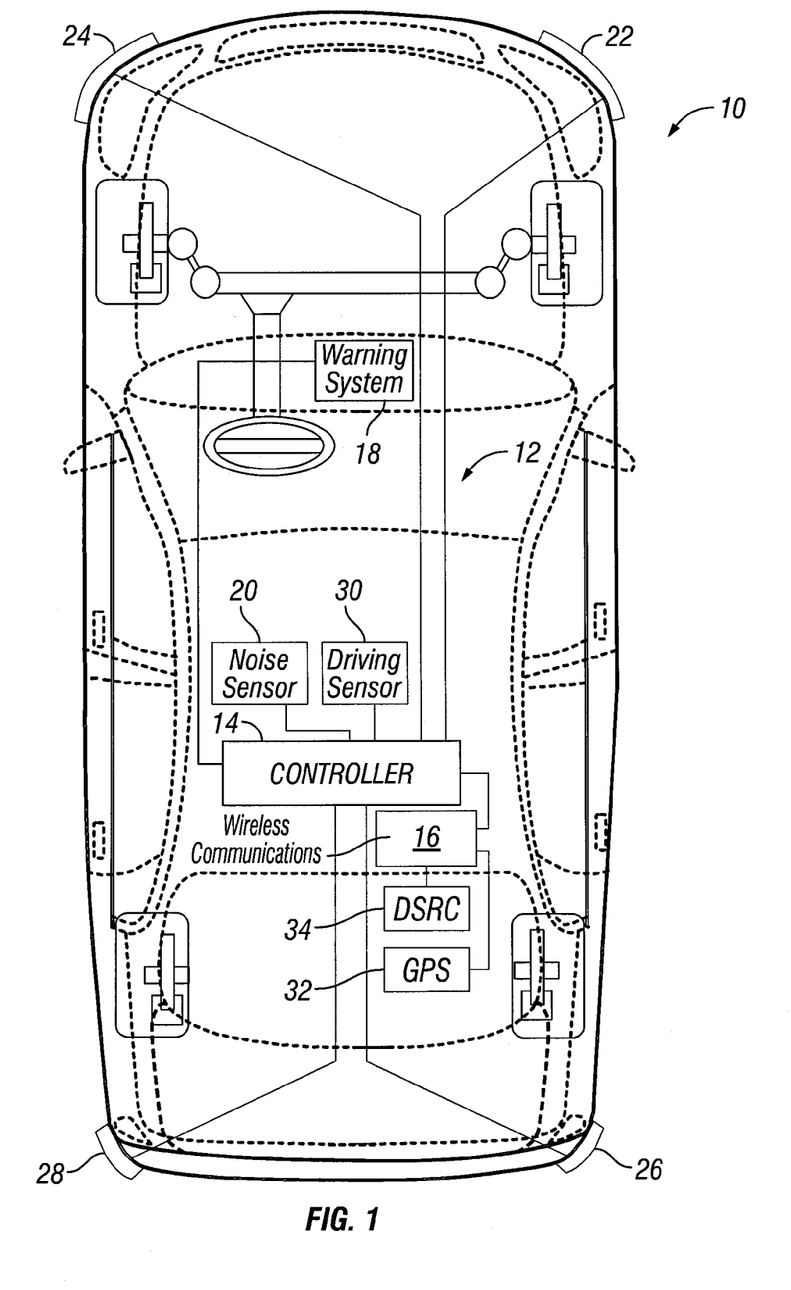
FIG. 1 is an overhead schematic view of a vehicle equipped with a contact avoidance system in accordance with one disclosed embodiment.

Referring initially to FIG. 1, a host vehicle 10 includes contact avoidance system 12 in accordance with one embodiment. The contact avoidance system 12 generally includes a controller or control unit 14, a wireless communications device 16, a warning system 18, a host vehicle internal ambient noise sensor 20, a plurality of obstacle sensors 22, 24, 26, and 28, and a host vehicle driving sensor 30 connected to the controller 14. A global positioning system (GPS) 32 and a dedicated short-range communications antenna (DSRC) 34 may be connected to the wireless communications device 16. However, the system 12 may include more components or elements or as few of the components listed above as desired.

The control unit 14 preferably includes a microcomputer with a control program that controls the contact avoidance system 12 as discussed below. The control unit 14 can also include other conventional components such as an input interface circuit, an output interface circuit, and storage devices such as a ROM (Read Only Memory) device and a RAM (Random Access Memory) device. The microcomputer of the control unit 14 is programmed to control the contact avoidance system. The memory circuit stores processing results and control programs that are run by the processor circuit. The control unit 14 is operatively coupled to the wireless communications device 16, the warning system 18, the host vehicle internal ambient noise sensor 20, the plurality of obstacle sensors 22, 24, 26, and 28, the host vehicle driving sensor 30, the GPS 32 and the DSRC antenna 34 in a conventional manner. The internal RAM of the control unit 14 stores statuses of operational flags and various control data. The internal ROM of the control unit 14 stores the information or data for various operations. The control unit 14 is capable of selectively controlling any of the components of the contact avoidance system 12 in accordance with the control program. It will be apparent to those skilled in the art from this disclosure that the precise structure and algorithms for the control unit 14 can be any combination of hardware and software that will carry out the functions of the disclosed embodiments. Preferably, the controller 14 is programmed to determine whether contact between the host vehicle 10 and the remote obstacle is imminent, and is further programmed to cause the warning system 18 to emit the warning sound based on a determination of whether contact with the remote obstacle is imminent.

Figure 2:
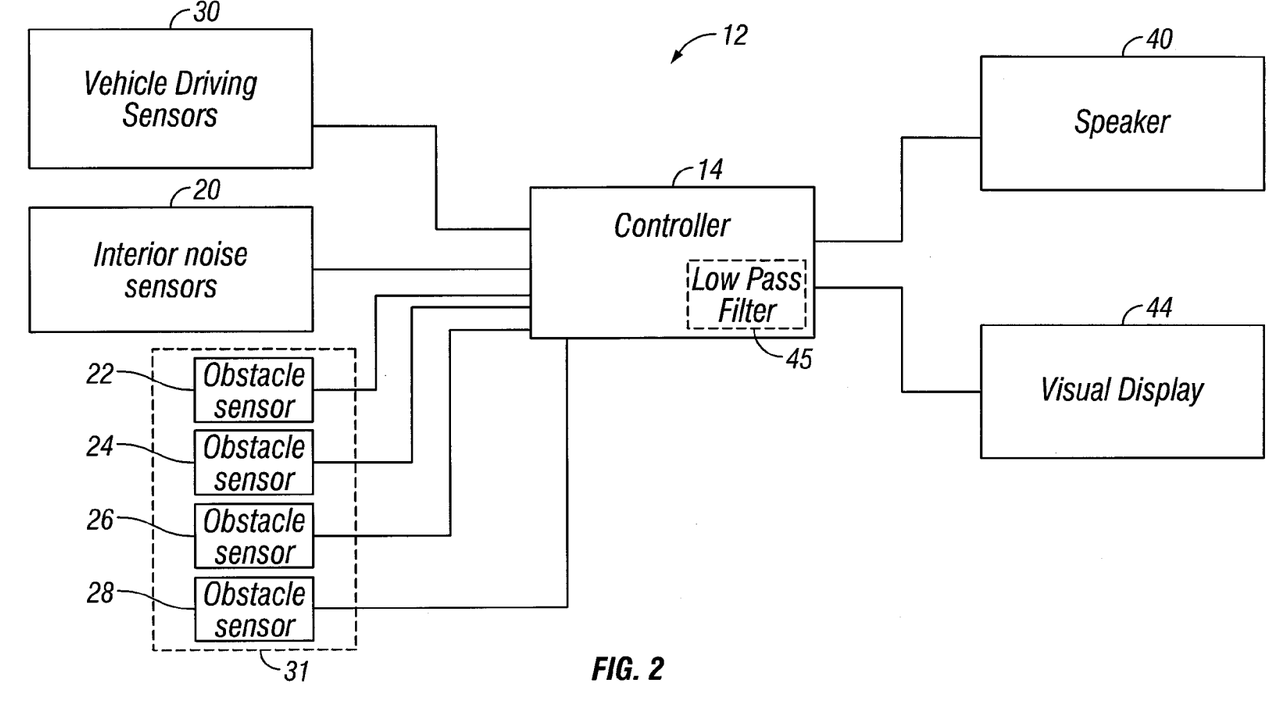
FIG. 2 is a functional block diagram of a vehicle contact avoidance system in accordance with one disclosed embodiment.

Preferably, as illustrated in FIGS. 1 and 2, the plurality of obstacle sensors 22, 24, 26, and 28 define a detection system 31 configured to detect a remote obstacle in proximity to a host vehicle 10. For example, as illustrated in FIG. 1, the obstacle sensors are preferably mounted externally on the host vehicle 10. However, the sensors may be mounted on any suitable external portion of the host vehicle 10, including the front and rear quarter panels, the bumpers, the external mirrors or any combination of suitable areas. The front sensors 22 and 24 can include a long-range radar device for object detection in front of the host vehicle 10. For example, the front sensors 22 and 24 may be configured to detect objects at a predetermined distance (e.g., distances up to 200 m), and thus may have a narrow field of view angle (e.g., around 15°). Due to the narrow field of view angle, long range radar may not detect all objects in the front of the host vehicle 10. Thus, if desired, the front corner sensors 22 and 24 can include short-range radar devices to assist in monitoring the region in front of the host vehicle 10, each having a 60° field of view angle and 40 m detection range in one embodiment. The rear sensors 26 and 28 may include short-range radar devices to assist in monitoring oncoming traffic beside and behind the host vehicle 10, each having a 60° field of view angle and 40 m detection range in one embodiment. Placement of the aforementioned sensors permits monitoring of traffic flow including remote vehicles and other objects around the host vehicle 10. However, the sensors 22, 24, 26 and 28 can be disposed in any position on the host vehicle 10 and may include any type and/or combination of sensors. The sensors may be cameras, radar sensors, photo sensors or any combination thereof. Although FIGS. 1 and 2 illustrate four sensors, there can be as few or as many sensors as desirable or suitable.

The sensors 22, 24, 26, and 28 can be electronic detection devices that transmit either electromagnetic waves (e.g., radar) or take computer-processed images with a digital camera and analyze the images or emit lasers, as is known in the art. The sensors may be capable of detecting at least the speed, direction, yaw, acceleration and distance of the remote obstacle relative to the host vehicle 10. Further, the sensors may include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. Object-locating devices may include charged-coupled devices (CCD) or complementary metal oxide semi-conductor (CMOS) video image sensors, and other known camera/video image processors which utilize digital photographic methods to "view" forward objects including one or more remote obstacles. The sensors 22, 24, 26, and 28 are in communication with the controller 14 and are capable of transmitting information to the controller 14. Thus, the controller 14 is programmed to determine if contact with the remote obstacle is imminent based on the information supplied by the detection system 31.

Figure 3:
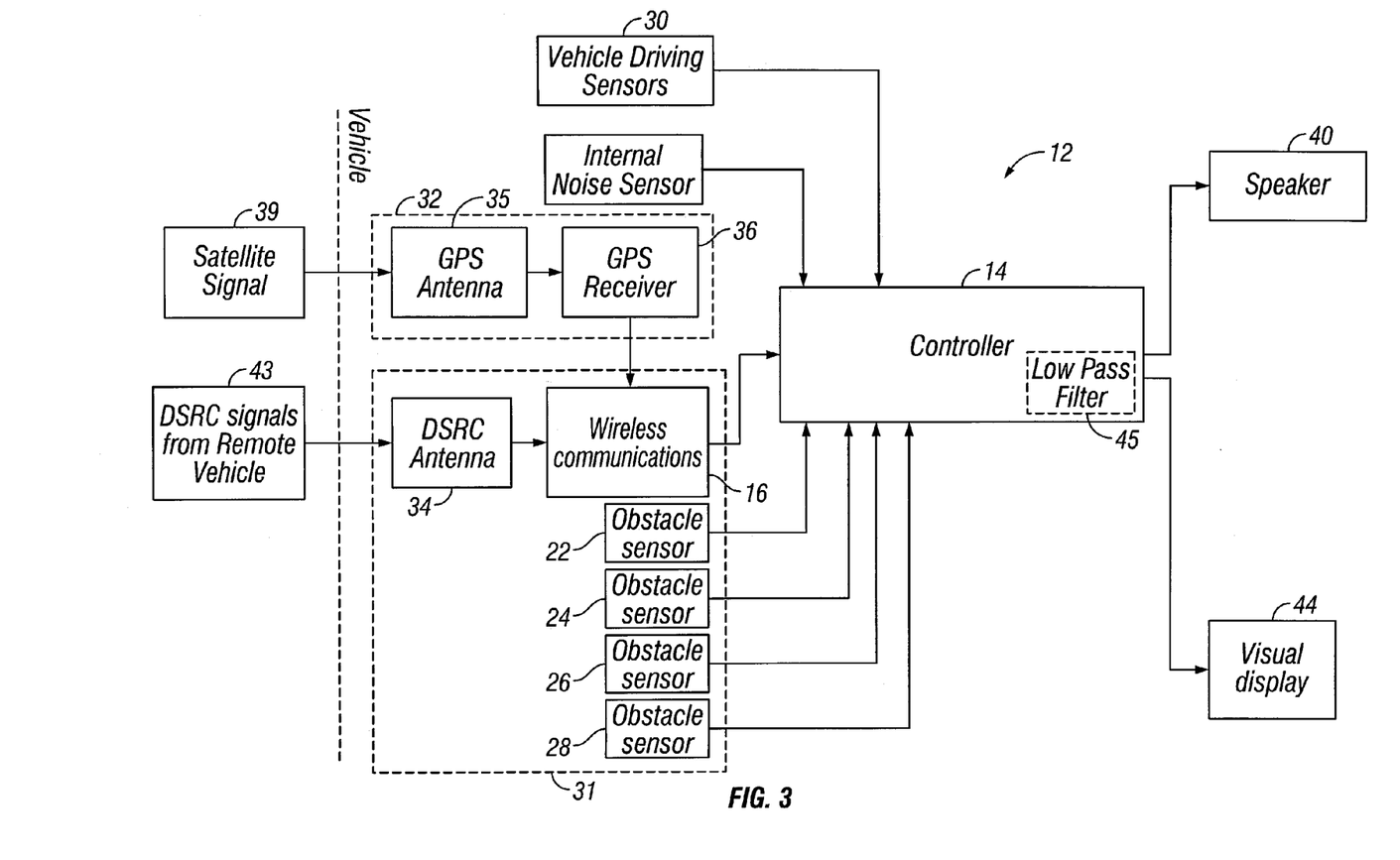
FIG. 3 is a functional block diagram of a modified vehicle contact avoidance system in accordance with a disclosed embodiment.
Figure 4:
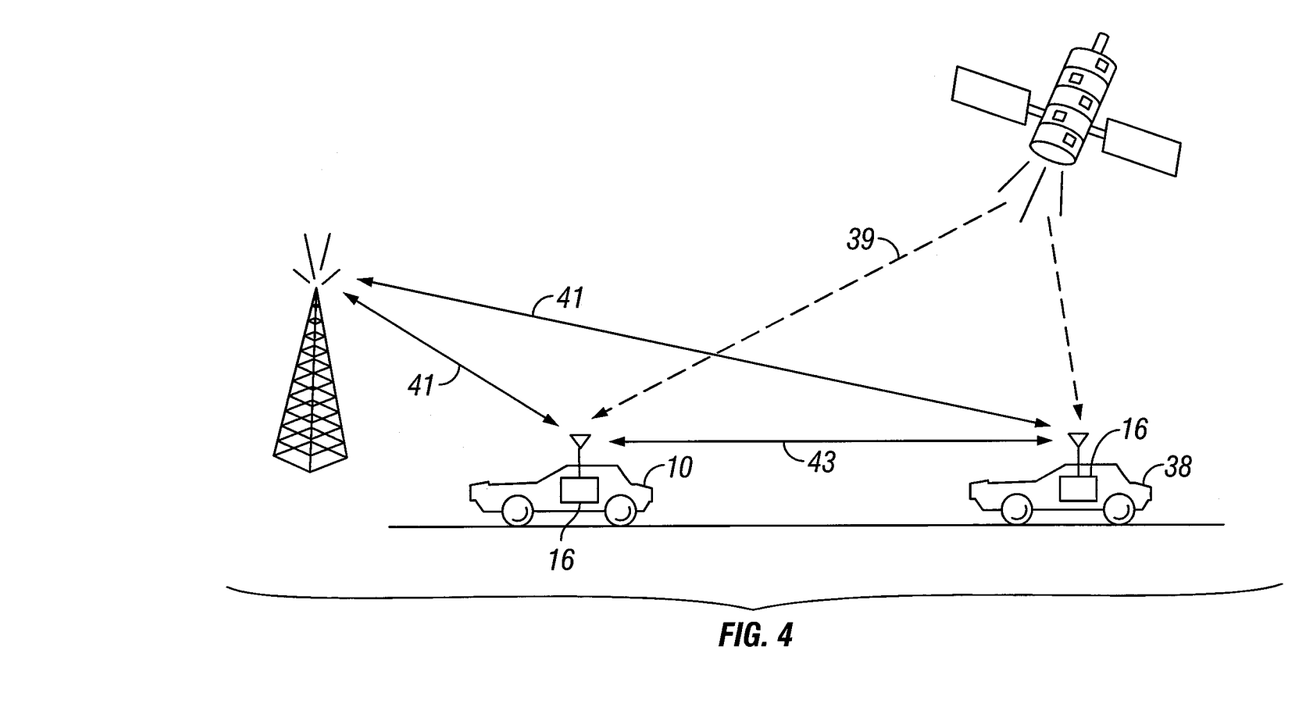
FIG. 4 illustrates GPS and DRSC signal transmissions in accordance with a disclosed embodiment.

In one embodiment, as illustrated in FIGS. 3 and 4, the detection system 31' can utilize the wireless communication system 16 and the DSRC antenna 34 in addition to or in place of the obstacle sensors 22, 24, 26 and 28. As discussed above, the DSRC antenna 34 communicates with the wireless communications device 16. The communications device 16 is coupled to the DSRC antenna 34 to receive 5.9 GHz DSRC signals 41 from the two-way wireless communications network 16. These DSRC signals can include basic safety messages (BSMs) that include information which, under certain circumstances, warns drivers of imminent vehicle contact in time for the driver of the host vehicle 10 to take appropriate action to avoid the vehicle contact. In the disclosed embodiments, a BSM includes information in accordance with SAE Standard J2735 as can be appreciated by one skilled in the art.

Accordingly, the host vehicle 10 can receive BSM signals 43 from a remote vehicle 38, including information pertaining to vehicle latitude, vehicle longitude, vehicle elevation, position accuracy, vehicle speed, vehicle heading, vehicle steering wheel angle, vehicle acceleration (e.g., lateral, longitudinal, vertical and yaw rate), vehicle brake status, vehicle size, vehicle location, vehicle heading and the vehicle intended next maneuver. The intended next maneuver of the remote vehicle 38 can be determined based on a condition of a turn signal on the remote vehicle 38. Alternatively, the intended next maneuver of the remote vehicle 38 can be determined based on a set navigation route for the remote vehicle 38 that can be set by, for example, a navigation system of the remote vehicle 38. The intended next maneuver of the remote vehicle 38 can be determined as a straight movement of the remote vehicle 38 at an intersection, a left turn of the remote vehicle 38 at an intersection or a right turn of the remote vehicle 38 at an intersection.

Additionally, the system may include a BSM classification application capable of, for example, caching BSM messages received from one or more remote vehicles 38 in a cache table, which can also be referred to as a lookup table. The cache table can include information representing the remote vehicle intended next maneuver, the remote vehicle location, and any other suitable information included in the BSMs which can then be retrieved for use as discussed herein. Also, the controller 14 can receive and process BSMs from many remote vehicles 38 at the same time. For example, the controller 14 can receive and process BSMs from 100 remote vehicles 38, or any other suitable number of remote vehicles 38, at the same time. Upon receiving a BSM from a remote vehicle 38, the controller 14 can determine whether there is a possibility that remote vehicle 38 may contact the host vehicle 10 and thus represents a potential threat vehicle to the host vehicle 10. If the remote vehicle 38 does not represent a threat, the controller 14 can, for example, discard the data included in the BSM. The controller 14 can also discard a BSM from the cache after a period of time, for example, 0.5 seconds or any suitable length of time.

In one embodiment, as illustrated in FIGS. 1-3, the host vehicle 10 may have a vehicle driving sensor 22. The vehicle driving sensor 22 detects driving conditions of the host vehicle 10, such as vehicle latitude, vehicle longitude, vehicle elevation, position accuracy, vehicle speed, vehicle heading, vehicle steering wheel angle, vehicle acceleration (e.g., lateral, longitudinal, vertical and yaw rate), vehicle brake status, vehicle size, and other aspects of the vehicle. The vehicle driving sensor 22 can be any suitable sensor known in the art. The vehicle driving sensor 22 can send or transmit this information to the controller 14 at periodic intervals (e.g., every 100 msec). Naturally, this information can include additional or fewer types of data as necessary or desired.

Alternatively or additionally, the system 12 may utilize a GPS 32 as illustrated in FIGS. 3 and 4. The GPS 32 preferably includes a GPS antenna 35 and a GPS receiver 36. As discussed above, the GPS antenna 35 communicates with the wireless communications device 16. In this example, as illustrated in FIG. 4, the host vehicle 10 receives a GPS satellite signal 39. As is understood, the GPS 32 processes the GPS satellite signal 39 to determine positional information (such as speed, acceleration, yaw, and direction, just to name a few) of the host vehicle 10. Also, the GPS antenna 35 and the DSRC antenna 34 can be configured as a dual frequency DSRC and GPS antenna as understood in the art.

Figure 5:
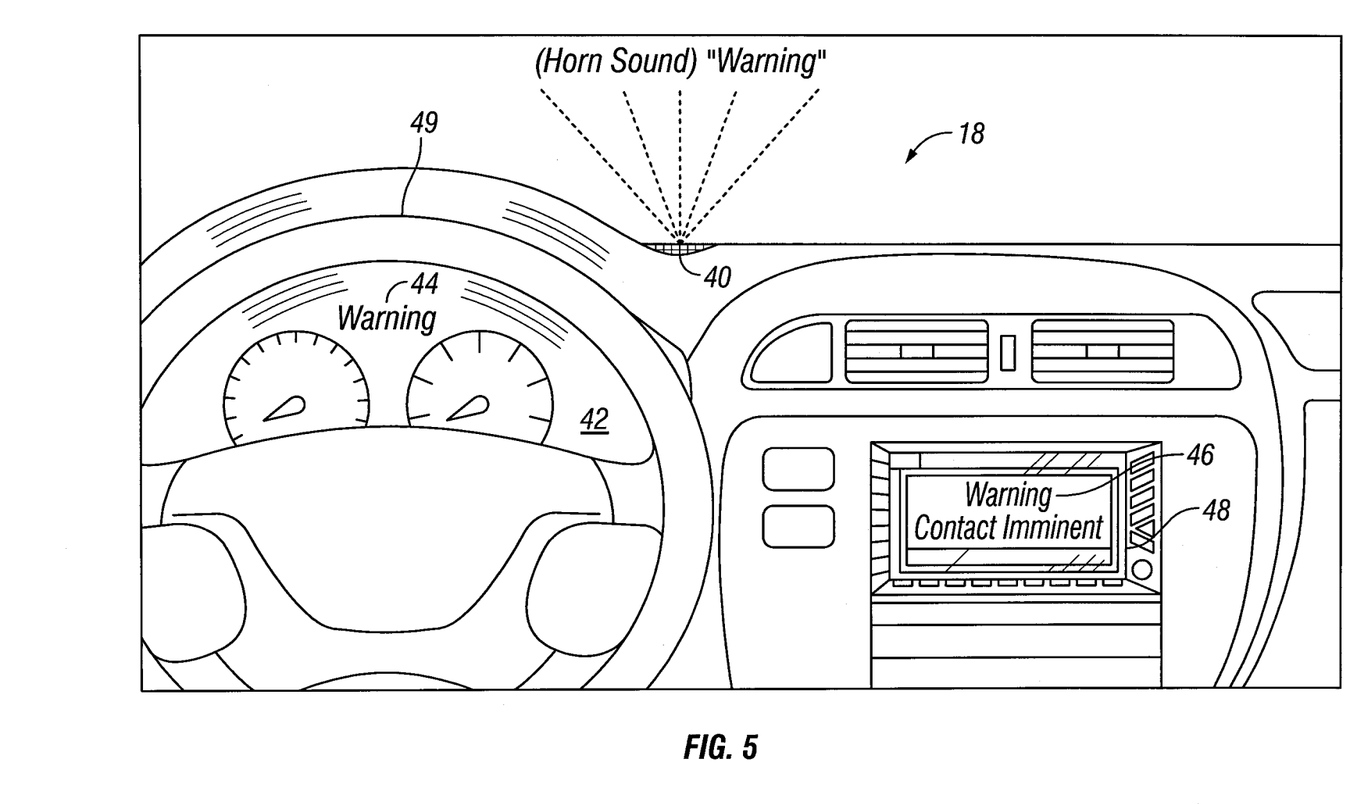
FIG. 5 is a partial interior view of the host vehicle illustrating features of the warning system in accordance with one disclosed embodiment.

Turning to FIG. 5, the warning system 18 is illustrated and preferably includes a sound device 40 (such as a speaker) mounted on the dashboard or instrument panel 42, and is configured such that it will activate the warning sound upon receiving a signal from the controller 14. The sound device may emanate the warning sound from speakers used for other applications (e.g., the radio) or from a dedicated speaker. In one embodiment, the warning sound includes a non-speech portion followed by a speech portion. The non-speech portion of the warning sound may be a beep, a series of beeps, a horn, or any other suitable or combination of suitable non-speech sound warnings.

It has been determined that auditory warnings are effective because they are noticeable regardless of the driver's eye position and because they have a relatively low implementation cost. Preferably the auditory warnings are digital files played from a sound generator, as discussed above, and are emitted from a dedicated speaker 40 or speakers mounted on the dashboard or the instrument panel near the driver; however, the auditory warning can be emitted from any suitable source, such as the audio system of the car. Activation of the sounds may be controlled by the controller 14 (which can include a dedicated application ECU or electronic control unit) based on information received from a remote obstacle or from the sensors 22, 24, 26 and 28.

In one embodiment the auditory warning has both a speech portion and a non-speech portion, the combination of which results in a signal length of about 0.6-1.7 seconds. It has been determined that such a length of sound enables perception and an appropriate time for reaction. However, any suitable length of warning and/or combination of speech and non-speech sounds may be used.

In one embodiment the auditory warning is a single auditory warning; however, if desired the warning may be multiple auditory warnings. In this embodiment the non-speech portion is preferably a horn sound, which has been determined to be effective at obtaining a driver's attention, while simultaneously communicating urgency due to familiarity of the horn sound to the driver. Further, the auditory warning in this embodiment includes a speech portion or signal, since such speech signals may be effective at communicating a specific threat.

Figure 6:
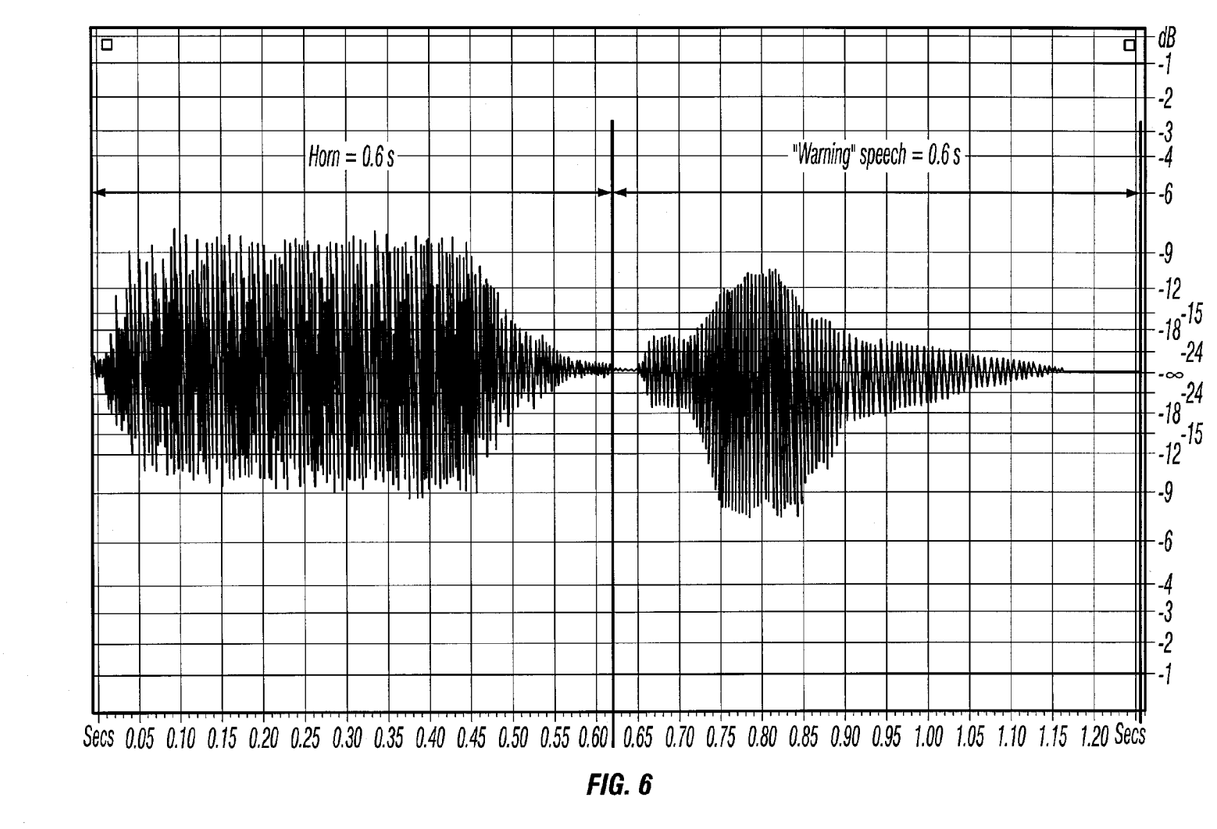
FIG. 6 is a sound profile of an audible warning according to one disclosed embodiment.

As illustrated in FIG. 6, the first portion of the auditory warning may be a horn sound having a duration of about 0.4 to 0.8 seconds, and more preferably about 0.6 seconds, and the second portion of the auditory warning is a speech sound having a duration of about 0.4 to 0.8 seconds, and more preferably about 0.6 seconds. Thus, as stated above, the preferable length of the auditory warning is less than or equal to 1.7 seconds. However, the length of each of the speech portion and non-speech portion can be shorter or longer than 0.4 to 0.8 seconds, if desired.

It has been determined that when a vehicle is making left turn in non-signalized left turn scenarios, the driver of the vehicle generally will turn when there is a perceived two second space or greater between the point when the driver starts to turn and the time when the approaching vehicle will arrive at the intersection. Thus, it is preferable to maintain the auditory warning signal at about 1.7 seconds or less.

In one embodiment the sound level of the auditory warning is about 68-70 dB-A as measured with a hand held sound meter at about the drivers head position. This sound level is generally noticeable even when the car radio is set at a level of around 65 dB-A.

The horn sound preferably has a frequency that is different from a conventional horn and has broadband content (i.e., sound pressure content across all ⅓ octave bands); however, any desired horn sound may be utilized. Moreover, to reduce the high pitch quality of the horn sound, a low pass filter 45 (shown in FIGS. 2 and 3) may be used to reduce the sound pressure content at ⅓ octave bands higher than 2500 Hz. It has been determined that 2500 Hz (2.5 kHz) and higher is most perceivable to people with average hearing capability. The low pass filter 45 is preferably hardware in the controller 14, but may be any suitable low pass filter.

The speech portion of the auditory warning is preferably utilized to confirm the meaning of the horn signal. That is, the speech portion may be utilized to confirm that contact with an obstacle is possible. In one embodiment, the spoken word "warning" may be used; however, any suitable word may be used. For example, it is possible to utilize multiple speech sounds or directional indicators, such as "look left", "look right", or any other suitable word or phrase that would confirm or enhance the non-speech warning sound.

In one embodiment, the spoken word is generated by a text-to-speech program using a computer-generated female voice; however, any gender voice may be utilized and the voice may be a recording or generated in any suitable manner. It has been determined that the speech portion preferred length of about 0.6 seconds is long enough for a two syllable word to be perceived, but is also brief enough to quickly communicate urgency. This results in a combined audible warning (speech portion and non-speech portion) having a total length of about 1.7 seconds or less.

Additionally, as shown in FIG. 5, the warning system 18 may include a visual display or indicator 44 that flashes or illuminates on the instrument cluster 42 of the host vehicle 10, illuminates in a heads-up display, is a visual readout 46 on an information display unit 48, or any other suitable visual display or indicator 44 that notifies the driver or interior occupant of the host vehicle 10 that contact with a remote obstacle is possible. As illustrated in FIG. 5, the warning may also include tactile feedback generated by a vibration actuator in the steering wheel 49, the driver seat or any other suitable location within the host vehicle 10.

In one embodiment an internal noise sensor 20 may be utilized. The internal ambient noise sensor 20 determines the internal noise level of the vehicle. Thus, for example, when the vehicle radio is set at a high level, the windows of the vehicle are open, or there is any additional internal noise that may affect the perception of warnings generated by the vehicle contact avoidance system 12, the internal noise sensor 20 detects and indicates this to the controller 14. The controller 14 can then adjust the decibel level of the warning indicator to be heard above the ambient noise level. Preferably, the controller 14 activates the warning sound 3-5 dB louder than the ambient noise detected by the internal ambient noise sensor 20. The internal ambient noise sensor 20 can be any suitable sensor known in the art.

Figure 7:
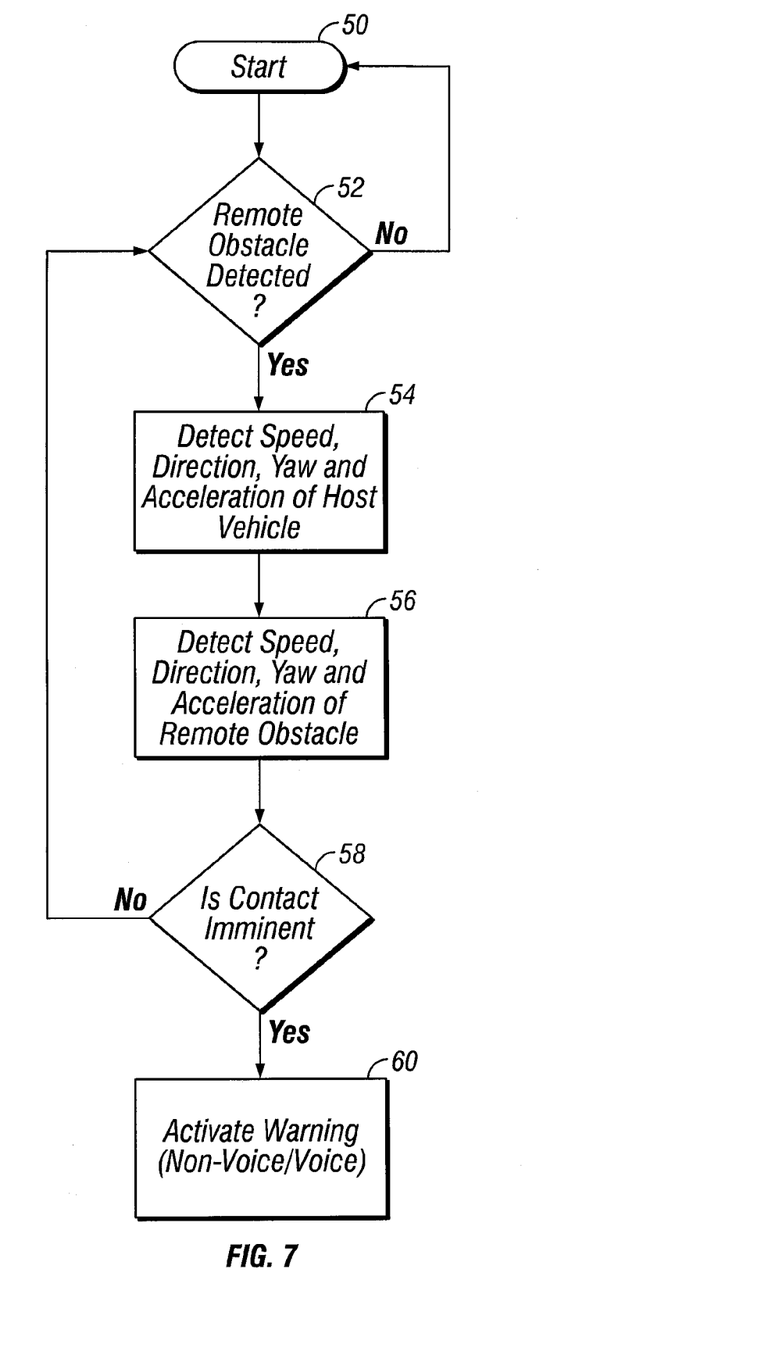
FIG. 7 is a flowchart illustrating steps executed by a controller according to a disclosed embodiment.

Generally, as illustrated in FIG. 7, when determining whether to activate the warning, the system starts the process at step 50. The system then detects or determines if a remote obstacle is present in the vicinity of the host vehicle 10 at step 52. As stated above, such a determination is made using the detection system 31 or 31'. If there is no obstacle detected, the system starts the process again. If an obstacle is detected, the detection system 31 communicates relevant information to the controller 14. That is, the detection system 31 communicates at least one of the speed, direction, yaw and acceleration of the host vehicle 10 (or any other suitable or desired information) to the controller 14 at step 54. For example, as discussed above, this information can be determined based on feedback from the on-board vehicle driving sensors 22 and/or information received by the DSRC antenna 34. The system then determines the speed, direction, yaw and acceleration of the remote obstacle at step 56. As discussed above, this determination may be made by the on board driving sensors 30 and/or the GPS 32. The controller 14, based on programming, uses the information regarding the remote obstacle and the host vehicle 10 to determine if contact between the host vehicle 10 and the remote obstacle is imminent at step 58. Such a determination can be made using known calculations based on at least the speed, direction, acceleration and yaw of the host vehicle 10 and the remote obstacle (or any other suitable or desired information). If the controller 14 determines that contact is not imminent, the system restarts and determines if a remote obstacle is present. If the controller 14 determines that contact is imminent, the system activates the warning at step 60. As stated above, the warning is preferably an audible warning that includes both a non-speech portion and a speech portion. Moreover, in one embodiment, as discussed above, the controller 14 causes the warning system 18 to activate the warning sound at 3-5 dB higher than any detected ambient noise. Further, as discussed in one embodiment, a light and/or tactile warning can be activated in addition to the sound warning.

Figure 8:
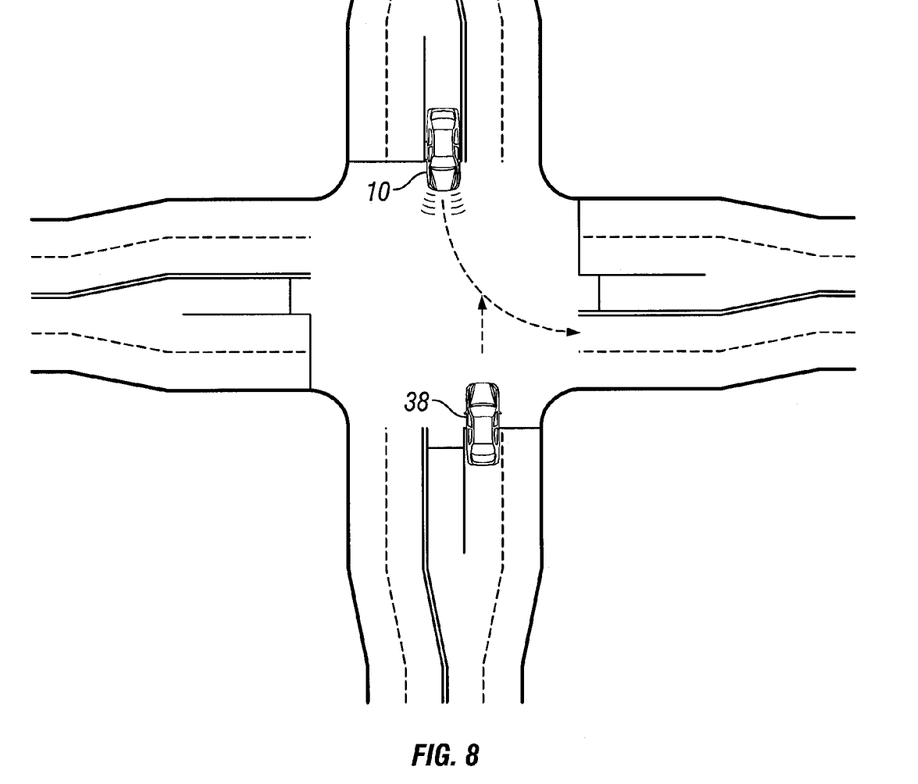
FIGS. 8-10 illustrate exemplary scenarios in which a contact avoidance system according to the disclosed embodiments is beneficial.
Figure 9:
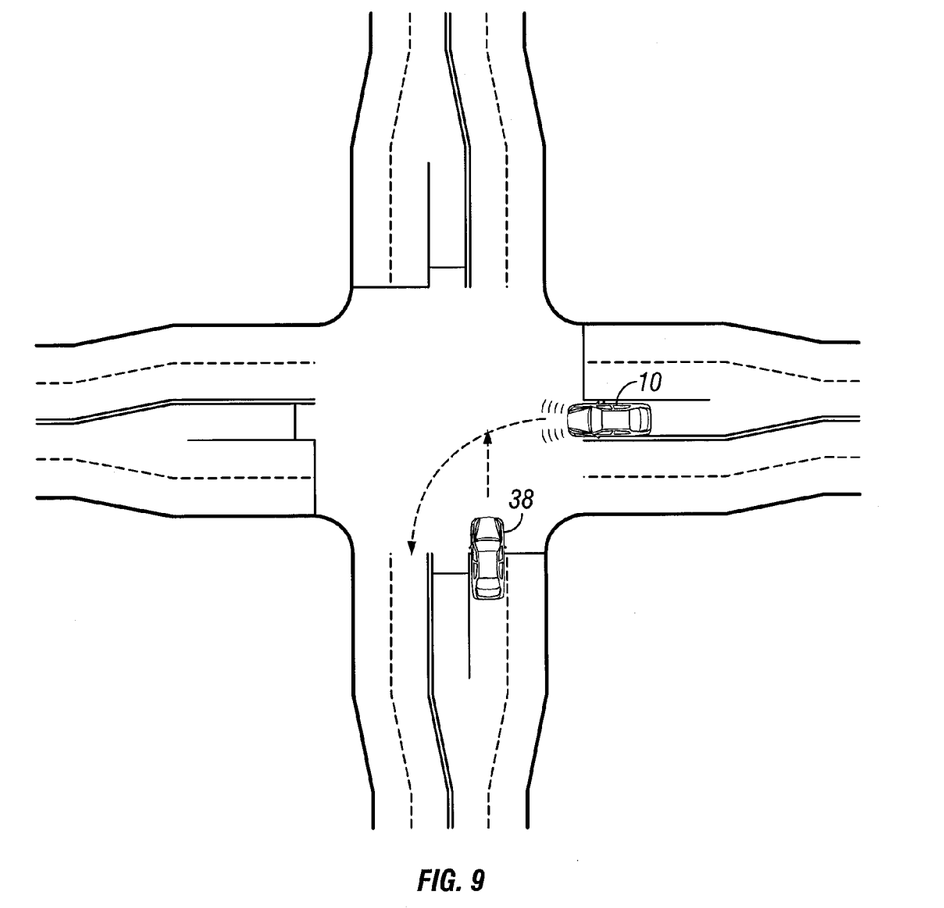
Figure 10:
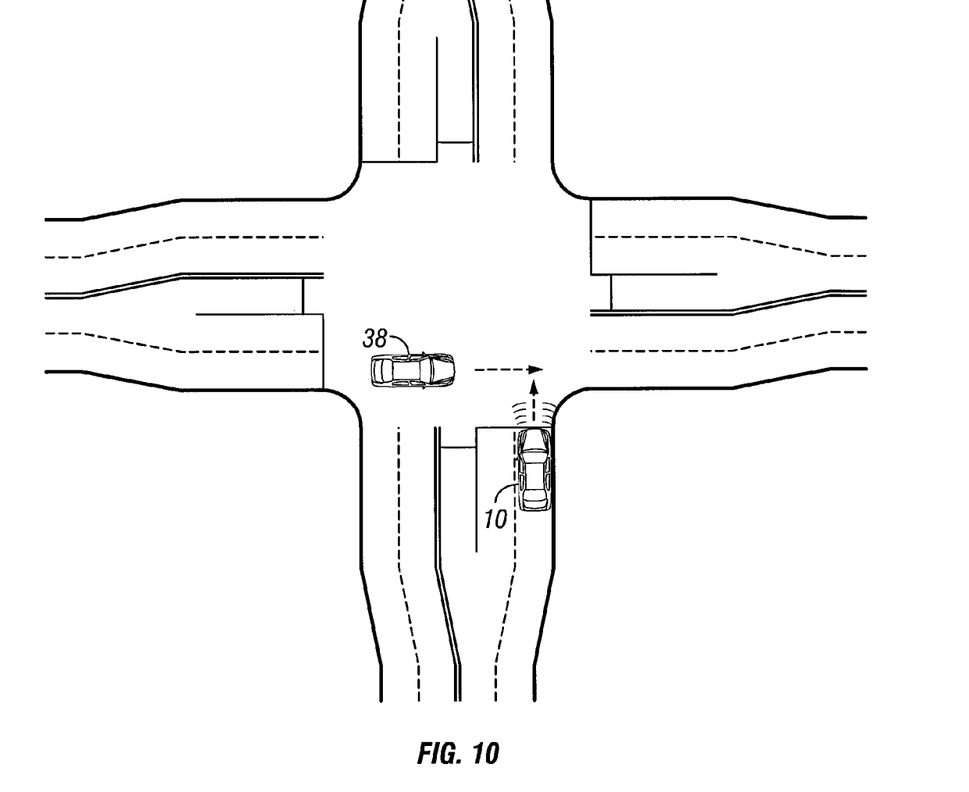

Several scenarios in which the system 12 is beneficial are illustrated in FIGS. 8-10. FIG. 8 illustrates a scenario in which the host vehicle 10 is turning left across a lane in which the remote vehicle 38 is traveling. In this scenario, the detection system 31 of the host vehicle 10 would detect the presence of the remote vehicle 38. Upon detection of the remote vehicle 38, the controller 14 determines whether contact between the host vehicle 10 and the remote vehicle 38 is imminent. As discussed above, such a determination may be based on feedback from the host vehicle driving sensor 30 and/or GPS 32, feedback from the obstacle sensors 22, 24, 26, and 28 and/or data received by the DSRC antenna 34. If a determination is made that no contact is imminent, no warning is activated. However, if the controller 14 determines that contact is imminent, the controller 14 causes the warning system 18 to emit the warning, which preferably includes a non-speech portion (e.g. a horn) followed by a speech portion (e.g., a voice stating "warning").

FIG. 9 illustrates a scenario in which the host vehicle 10 is turning left at an intersection and the remote vehicle 38 is traveling in a direction transverse to the host vehicle 10. In this scenario, the detection system 31 of the host vehicle 10 would detect the presence of the remote vehicle 38. Upon detection of the remote vehicle 38, the controller 14 determines whether contact between the host vehicle 10 and the remote vehicle 38 is imminent. As discussed above, such a determination may be based on feedback from the host vehicle driving sensor 30 and/or GPS 32, feedback from the obstacle sensors 22, 24, 26, and 28 and/or data received by the DSRC antenna 34. If a determination is made that no contact is imminent, no warning is activated. However, if the controller 14 determines that contact is imminent, the controller 14 causes the warning system 18 to emit the warning, which preferably includes a non-speech portion (e.g. a horn) followed by a speech portion (e.g., a voice stating "warning").

FIG. 10 illustrates a scenario in which the host vehicle 10 is traveling across an intersection and the remote vehicle 38 is traveling in a direction transverse to the host vehicle 10. In this scenario, the detection system 31 of the host vehicle 10 would detect the presence of the remote vehicle 38. Upon detection of the remote vehicle 38, the controller 14 determines whether contact between the host vehicle 10 and the remote vehicle 38 is imminent. As discussed above, such a determination may be based on feedback from the host vehicle driving sensor 30 and/or GPS 32, feedback from the obstacle sensors 22, 24, 26, and 28 and/or data received by the DSRC antenna 34. If a determination is made that no contact is imminent, no warning is activated. However, if the controller 14 determines that contact is imminent, the controller 14 causes the warning system 18 to emit the warning, which preferably includes a non-speech portion (e.g. a horn) followed by a speech portion (e.g., a voice stating "warning").

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," or "element" when used in the singular can have the dual meaning of a single part or a plurality of parts. Also as used herein to describe the above embodiments, the following directional terms "front", "rear", "vertical", "horizontal", "below" and "transverse" as well as any other similar directional terms refer to those directions of a vehicle equipped with the vehicle contact avoidance system. Accordingly, these terms, as utilized to describe the present invention should be interpreted relative to a vehicle equipped with the vehicle contact avoidance system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree, such as "about", as used herein means a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle contact avoidance system comprising:
a detection system configured to detect a remote obstacle in proximity to a host vehicle equipped with the vehicle contact avoidance system, including information related to at least one of a speed, a direction and a distance of the remote obstacle relative to the host vehicle;
a warning system configured to emit a warning sound to notify a driver of the host vehicle of imminent contact between the host vehicle and the remote obstacle; and
a controller programmed to determine whether contact between the host vehicle and the remote obstacle is imminent based of the information supplied to the controller by the detection system, and programmed to cause the warning system to emit the warning sound, wherein the warning sound includes a non-speech portion and a language portion.

2. The vehicle contact avoidance system according to claim 1, wherein the non-speech portion of the warning sound includes a horn sound lasting between 0.4 and 0.8 seconds.

3. The vehicle contact avoidance system according to claim 2, wherein the host vehicle includes a horn configured to be activated by the driver of the host vehicle, and the horn of the warning sound has a frequency that is different from a frequency of the horn of the host vehicle.

4. The vehicle contact avoidance system according to claim 2, wherein the warning system emits the language portion of the warning sound after the non-speech portion of the warning sound.

5. The vehicle contact avoidance system according to claim 2, wherein the language portion lasts about 0.6 seconds.

6. The vehicle contact avoidance system according to claim 1, further comprising ambient noise sensors configured to detect ambient noise in the host vehicle, wherein the warning system emits the warning sound 3-5 dB louder than the ambient noise detected by the ambient noise sensors.

7. The vehicle contact avoidance system according to claim 1, further comprising vehicle driving sensors configured to sense information related to at least one of yaw rate, direction, speed and acceleration of the host vehicle, and wherein the controller is programmed to determine whether contact between the host vehicle and the remote obstacle is imminent based on the information supplied to the controller by the vehicle driving sensors.

8. The vehicle contact avoidance system according to claim 1, wherein the warning sound is less than or equal to 1.7 seconds in duration.

9. The vehicle contact avoidance system according to claim 1, wherein the warning system includes a visible indicator, and the controller is configured to cause the warning system to activate the visible indicator upon the controller determining that contact between the host vehicle and the remote vehicle is imminent.

10. The vehicle contact avoidance system according to claim 1, wherein the detection system includes at least one of radar, a camera and a laser.

11. The vehicle contact avoidance system according to claim 1, wherein the remote obstacle is a remote vehicle, and the detection system includes a global positioning system and a receiver configured to receive data transmitted by the remote vehicle.

12. The vehicle contact avoidance system according to claim 1, wherein the warning system includes at least one speaker configured to emit the warning sound.

13. The vehicle contact avoidance system according to claim 12, wherein the at least one speaker is configured to be disposed in an instrument panel of the host vehicle proximate to the driver.

14. The vehicle contact avoidance system according to claim 1, wherein the controller includes a low pass filter configured to omit high frequency content of the warning sound.

15. The vehicle contact avoidance system according to claim 1, wherein the non-speech portion of the warning sound includes a horn sound having a frequency of 2.5 KHz or lower.

16. The vehicle contact avoidance system according to claim 15, wherein the horn sound lasts between 0.4 and 0.8 seconds.

17. The vehicle contact avoidance system according to claim 16, wherein the warning system emits the language portion of the warning sound after the non-speech portion of the warning sound horn sound, and the language portion lasts about 0.6 seconds.

18. The vehicle contact avoidance system according to claim 1, wherein the language portion includes a directional indication of the remote obstacle.

* * * * *